United States Patent
Bhakta et al.

(10) Patent No.: US 11,867,907 B2
(45) Date of Patent: Jan. 9, 2024

(54) OPTICAL SYSTEMS WITH LENS-BASED STATIC FOVEATION

(71) Applicant: Apple Inc., Cupertino, CA (US)

(72) Inventors: Vikrant Bhakta, Santa Clara, CA (US); David A. Kalinowski, Davis, CA (US); Hyungryul Choi, San Jose, CA (US); Nathanael D. Parkhill, Menlo Park, CA (US); Stanley K. Melax, Los Gatos, CA (US); Byron R. Cocilovo, Sunnyvale, CA (US)

(*) Notice: Subject to any disclaimer, the term of this patent is extended or adjusted under 35 U.S.C. 154(b) by 164 days.

(21) Appl. No.: 17/474,366

(22) Filed: Sep. 14, 2021

(65) Prior Publication Data

US 2021/0405379 A1 Dec. 30, 2021

Related U.S. Application Data

(63) Continuation of application No. PCT/US2020/050566, filed on Sep. 11, 2020.

(60) Provisional application No. 62/901,412, filed on Sep. 17, 2019.

(51) Int. Cl.
 *G02B 27/01* (2006.01)

(52) U.S. Cl.
 CPC .... *G02B 27/0172* (2013.01); *G02B 2027/011* (2013.01); *G02B 2027/0125* (2013.01); *G02B 2027/0147* (2013.01); *G02B 2027/0163* (2013.01)

(58) Field of Classification Search
 CPC .............. G02B 27/017; G02B 27/0172; G02B 27/0176; G02B 27/0179; G06F 3/011; H04N 23/66
 See application file for complete search history.

(56) References Cited

U.S. PATENT DOCUMENTS

| | | | |
|---|---|---|---|
| 5,726,670 | A | 3/1998 | Tabata et al. |
| 7,418,170 | B2 | 8/2008 | Mukawa et al. |
| 7,495,638 | B2 | 2/2009 | Lamvik et al. |
| 9,076,205 | B2 | 7/2015 | Cho et al. |
| 9,798,147 | B1 * | 10/2017 | Park ............... G03H 1/2294 |
| 10,394,029 | B2 | 8/2019 | Ayres et al. |
| 2002/0109819 | A1 | 8/2002 | Tuval |

(Continued)

FOREIGN PATENT DOCUMENTS

| | | |
|---|---|---|
| WO | 2009126264 A2 | 10/2009 |
| WO | 2018035045 A1 | 2/2018 |

*Primary Examiner* — Nitin Patel
*Assistant Examiner* — Cory A Almeida
(74) *Attorney, Agent, or Firm* — Treyz Law Group, P.C.; Michael H. Lyons

(57) ABSTRACT

An electronic device may include a display module that produces light having an image, a lens that directs the light to a waveguide, and a waveguide that directs the light to an eye box. The lens may produce a foveated image in the light by applying a non-uniform magnification to the image in the light. The non-uniform magnification may vary as a function of angle within a field of view of the lens. This may allow the foveated image to have higher resolution within the central region than in the peripheral region. Performing foveation using the lens maximizes the resolution of images at the eye box without increasing the size of the display module. Control circuitry on the device may apply a pre-distortion to the image that is an inverse of distortion introduced by the lens in producing the foveated image.

20 Claims, 9 Drawing Sheets

(56) References Cited

U.S. PATENT DOCUMENTS

| | | | |
|---|---|---|---|
| 2002/0167461 A1* | 11/2002 | Bronson | G09G 3/003 345/7 |
| 2009/0309811 A1 | 12/2009 | Hinton | |
| 2014/0140654 A1 | 5/2014 | Brown et al. | |
| 2016/0198949 A1* | 7/2016 | Spitzer | A61B 3/111 351/204 |
| 2017/0176753 A1 | 6/2017 | Shi et al. | |
| 2017/0285349 A1 | 10/2017 | Ayres et al. | |
| 2019/0187471 A1* | 6/2019 | Ma | G02B 6/0013 |
| 2019/0331919 A1 | 10/2019 | Huo et al. | |
| 2020/0132996 A1* | 4/2020 | Yokota | G06F 3/013 |

* cited by examiner

OPTICAL SYSTEMS WITH LENS-BASED STATIC FOVEATION

This application is a continuation of international patent application No. PCT/US2020/050566, filed Sep. 11, 2020, which claims the benefit of U.S. provisional patent application No. 62/901,412, filed Sep. 17, 2019, which are hereby incorporated by reference herein in their entireties.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display module that generates light and an optical system that redirects the light from the display module towards an eye box. The optical system may include a waveguide having an input coupler and an output coupler. The optical system may include a lens that directs the light from the display module towards the waveguide. The display module may include a reflective display panel, an emissive display panel, or other display hardware.

The lens may perform static foveation operations on the light produced by the display module. For example, the light generated by the display module may include an image. The lens may produce a foveated image by applying a non-uniform magnification to the image in the light. The non-uniform magnification may vary as a function of angle within a field of view of the lens. For example, the lens may apply more magnification to a peripheral region of the field of view, and thus the image, than to a central region of the field of view. This may allow the foveated image to have a higher resolution within the central region than in the peripheral region. Performing foveation using the lens maximizes the resolution of images at the eye box without increasing the size of the display module. Control circuitry on the device may apply a pre-distortion to the image prior to the image being displayed by the display module. The pre-distortion may be an inverse of distortion introduced by the lens in producing the foveated image.

DETAILED DESCRIPTION

Figure 1:
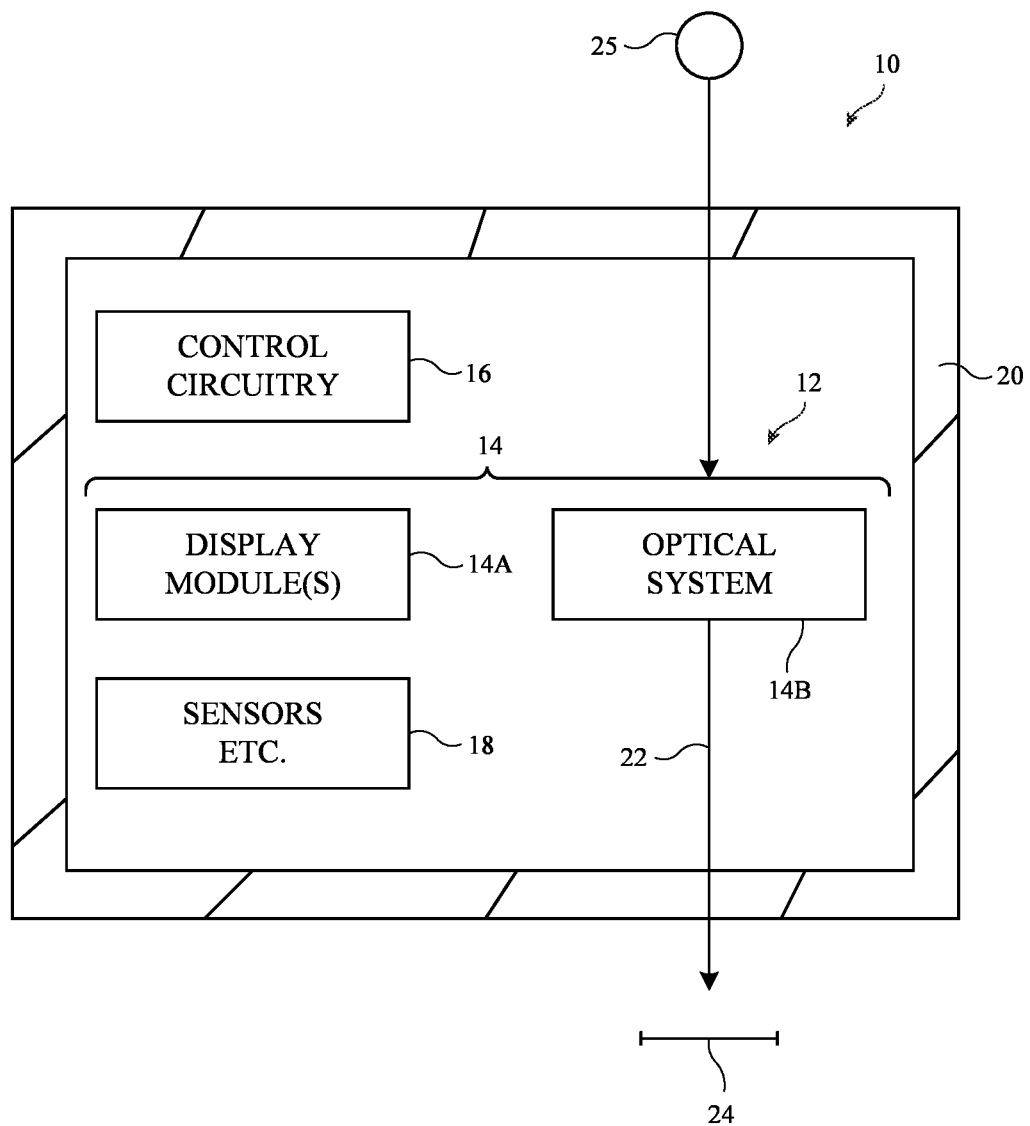
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (image light) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 14A may include reflective displays (e.g., liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
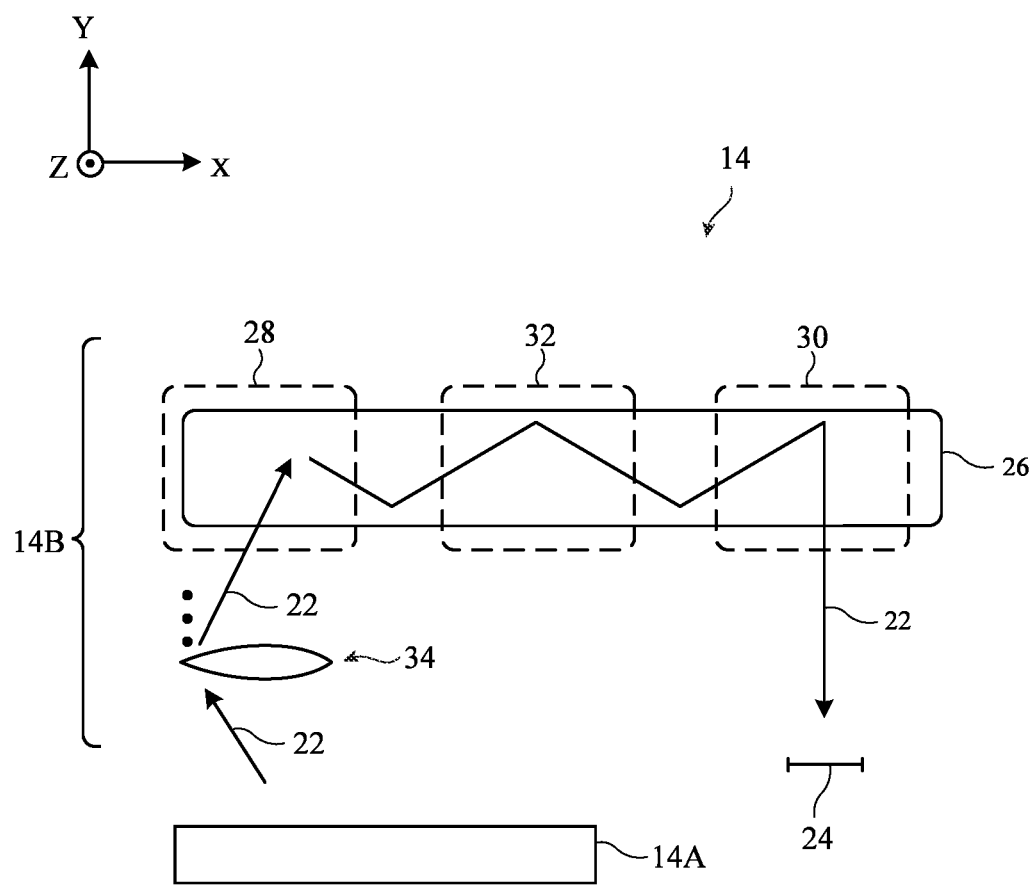
FIG. 2 is a top view of an illustrative optical system for a display having a lens that performs static foveation operations on image light provided to a waveguide in accordance with some embodiments.

FIG. 2 is a top view of an illustrative display 14 that may be used in system 10 of FIG. 1. As shown in FIG. 2, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Lens 34 may include one or more lens elements that help direct image light 22 towards waveguide 26. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may generate light 22 associated with image content to be displayed to eye box 24. Light 22 may be collimated using a lens such as collimating lens 34. Optical system 14B may be used to present light 22 output from display module 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide light 22 down its length via total internal reflection. Input coupler 28 may be configured to couple light 22 from display module 14A (lens 34) into waveguide 26, whereas output coupler 30 may be configured to couple light 22 from within waveguide 26 to the exterior of waveguide 26 and towards eye box 24. For example, display module 14A may emit light 22 in direction +Y towards optical system 14B. When light 22 strikes input coupler 28, input coupler 28 may redirect light 22 so that the light propagates within waveguide 26 via total internal reflection towards output coupler 30 (e.g., in direction X). When light 22 strikes output coupler 30, output coupler 30 may redirect light 22 out of waveguide 26 towards eye box 24 (e.g., back along the Y-axis). In scenarios where cross-coupler 32 is formed at waveguide 26, cross-coupler 32 may redirect light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, or other reflectors). In arrangements where couplers 28, 30, and 32 are based on holographic optics, couplers 28, 30, and 32 may include diffractive gratings (e.g., volume holograms, surface relief gratings, etc.).

Figure 3:
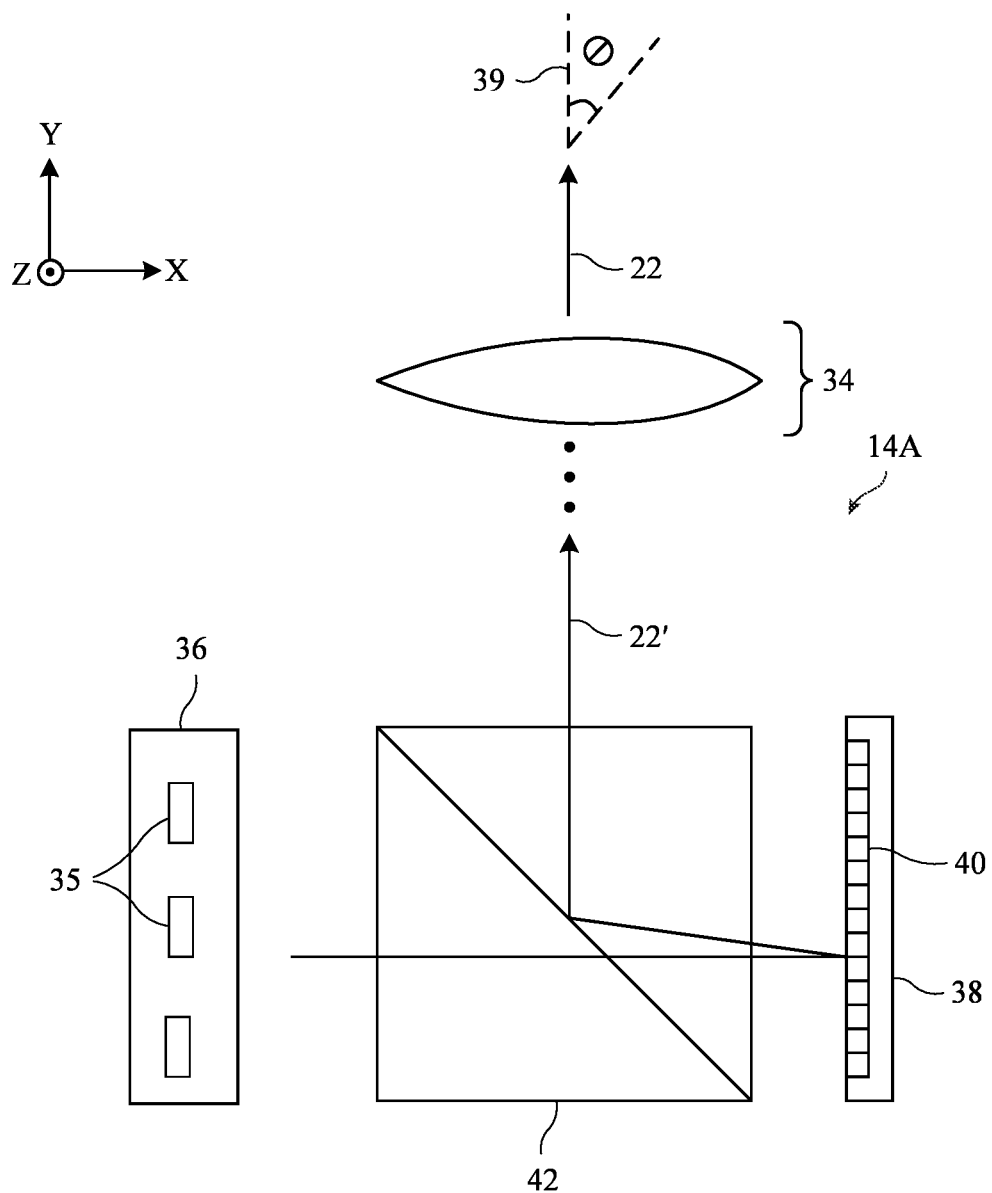
FIG. 3 is a top view of an illustrative reflective display that may be used to provide light to a lens of the type shown in FIG. 2 in accordance with some embodiments.

FIG. 3 is a diagram of display module 14A in a scenario where display module 14A is a reflective-type display. As shown in FIG. 3, display module 14A may include an illumination source such as light source 36. Light source 36 may have one or more light-emitting components (elements) 35 for producing output light. Light-emitting elements 35 may be, for example, light-emitting diodes (e.g., red, green, and blue light-emitting diodes, white light-emitting diodes, and/or light-emitting diodes of other colors). Illumination may also be provided using light sources such as lasers or lamps.

In the example of FIG. 3, display module 14A is a reflective display module such as a liquid-crystal-on-silicon (LCOS) display module, a microelectromechanical systems (MEMs) display module (sometimes referred to as digital micromirror devices (DMDs)), or other display modules (e.g., spatial light modulators). An optical component such as prism 42 may be interposed between light source 36 and display panel 38. Display panel 38 may be, for example, an LCOS display panel, a DMD panel (e.g., a panel having an array of micromirrors), etc. Optical components such as polarizers, beam splitters, lenses, and/or other components may be interposed between light source 36 and prism 42, between prism 42 and display panel 38, and/or between lens 34 and prism 42.

Display panel 38 may include pixel array 40 (e.g., an array of micromirrors where each micromirror corresponds to a given pixel in the image in scenarios where display panel 38 is a DMD panel). As illustrated by light ray 22', prism 42 may be used to couple illumination from light source 36 to display panel 38 and may be used to couple reflected image light from pixel array 40 of display panel 38 to lens 34. Lens 34 may be used to provide image light from display module 14A (e.g., as light 22) to waveguide 26 of FIG. 2. Lens 34 may have a relatively wide field of view (e.g., at least 52°×52°, at least 52° by 30°, etc.).

The example of FIG. 3 is merely illustrative and, in general, display module 14A may be implemented as an emissive display module (e.g., having a uLED panel, etc.) or other types of display modules (e.g., display modules having light projectors, scanning mirrors, etc.). Display module 14A may include multiple light sources 36 located at the same and/or different sides of prism 42. Each light source 36 and/or each light-emitting element 35 may be independently controlled (e.g., may be independently activated or deactivated, emit light with independently-controlled intensities, etc.). Each light source 36 may include light-emitting elements 35 that emit light of the same wavelength range (e.g., color) or may include different light-emitting elements 35 that emit light in two or more different wavelength ranges (e.g., colors). The light sources 35 in each light source 36 may be arranged in an M-by-N array or in any other desired pattern if desired.

It may be desirable to display high resolution images using display 14. However, in practice, the human eye may only be sensitive enough to appreciate the difference between higher resolution and lower resolution image data near the center of its field of view (e.g., a user may be less sensitive to low resolution image data in portions of the image at the periphery of the user's field of view). In practice, providing high resolution image data within the entirety of the field of view may consume an excessive amount of processing and optical resources within display 14, particularly given that users are only sensitive to high resolution image data near the center of the field of view. Display 14 may therefore be a foveated display that displays only critical portions of an image at high resolution to help reduce the burdens on system 10.

In general, increasing the physical size of display module 14A (e.g., display panel 38 of FIG. 3) will increase the maximum resolution of the images that can be displayed using light 22. However, space is often at a premium in compact systems such as system 10 of FIG. 1. It would therefore be desirable to be able to provide high resolution images while also conserving processing and optical resources in system 10 and without further increasing the size of display module 14A (e.g., display panel 38).

In order to provide high resolution images without undesirably burdening the resources of system 10 and without further increasing the size of display module 14A, lens 34 may be configured to perform static foveation operations on light 22. Lens 34 may, for example, convert images in the light 22' received from display module 14A into statically foveated images in light 22, which are then conveyed to the eye box (e.g., the light 22 conveyed to eye box 24 by waveguide 26 of FIG. 2 may include statically foveated images). The statically foveated images may include high resolution region(s) and low resolution region(s) that correspond to the pixels in the images in light 22'. Lens 34 may create the high resolution and low resolution regions in the statically foveated images by using a non-uniform magnification as a function of angle within the field of view (e.g., the magnification of lens 34 may vary as a function of angle θ relative to optical axis 39 within its field of view).

Figure 4:
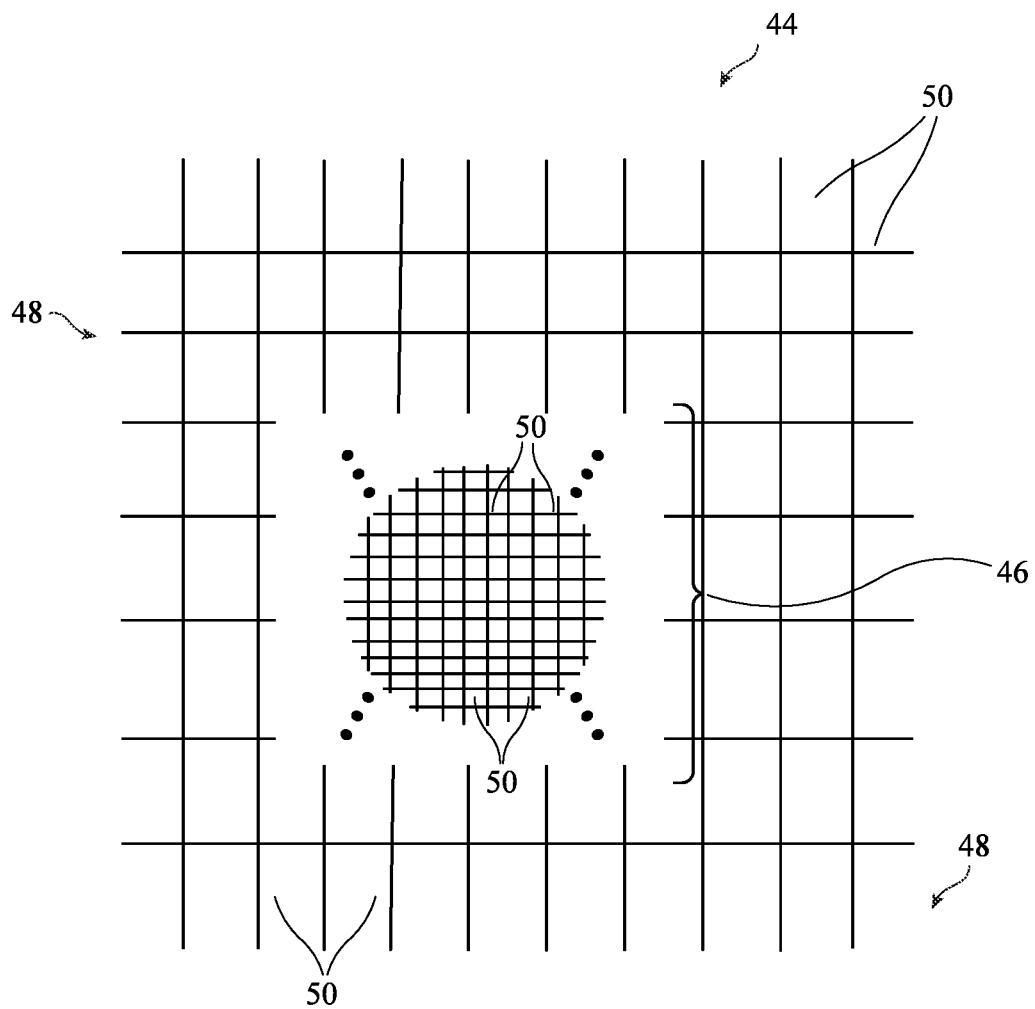
FIG. 4 is a diagram of an illustrative statically foveated image that may be output by a lens of the type shown in FIG. 2 in accordance with some embodiments.

FIG. 4 is a diagram showing a statically foveated image that may be produced by lens 34 based on image light 22' of FIG. 3. Light 22' may include an image (e.g., as produced by pixel array 40 in display panel 38 upon reflection of illumination light from light source 36). The image may include pixels. Lens 34 may magnify light 22' and thus the image in light 22' with a magnification (optical power) that varies as a function of angle within the field of view of lens 34 (and thus as a function of pixel position in the image).

For example, lens 34 may magnify the image in light 22' with a magnification that varies as a function of angle within its field of view to produce statically foveated image 44 of FIG. 4. As shown in FIG. 4, statically foveated image 44 may include lower resolution pixels 50 in regions 48 and higher resolution pixels 50 in one or more regions 46. Region 46 may, for example, be a central region located at a center of the image and thus at a center of the field of view of lens 34. Regions 48 may, for example, be peripheral regions that run along the periphery of the image (e.g., around region 46) and thus along the periphery of the field of view.

Each pixel 50 in statically foveated image 44 may correspond to a respective pixel from the image received by lens 34 in light 22'. However, lens 34 may exhibit a higher magnification at relatively high angles within the field of view (e.g., at pixel positions corresponding to regions 48) while simultaneously exhibiting a lower magnification near the center of the field of view (e.g., at pixel positions within region 46). This may cause the pixels 50 in regions 48 to exhibit a relatively large size (pitch), whereas the pixels in region 46 exhibit a relatively small size. This configures statically-foveated image 44 to exhibit a relatively high resolution (e.g., a relatively high pixel density) within region 46 and a relatively low resolution (e.g., a relatively low pixel density) within regions 48.

Because statically foveated image 44 has a higher resolution within central region 46 than within peripheral regions 48, the user (e.g., at eye box 24 of FIG. 2) may perceive statically foveated image 44 as a high resolution image (e.g., because the user's eye is sensitive to the high resolution within central region 46 and is insensitive to the lower resolution within peripheral regions 48). This may allow the images displayed at eye box 24 to effectively appear as high resolution images without requiring an increase in the size of display module 14A or the processing and optical resources of system 10 (e.g., the foveation may be statically performed by lens 34 without imposing any increased burden on the other components in system 10). The example of FIG. 4 is merely illustrative. Regions 46 and 48 may have any desired shapes and/or sizes.

Figure 5:
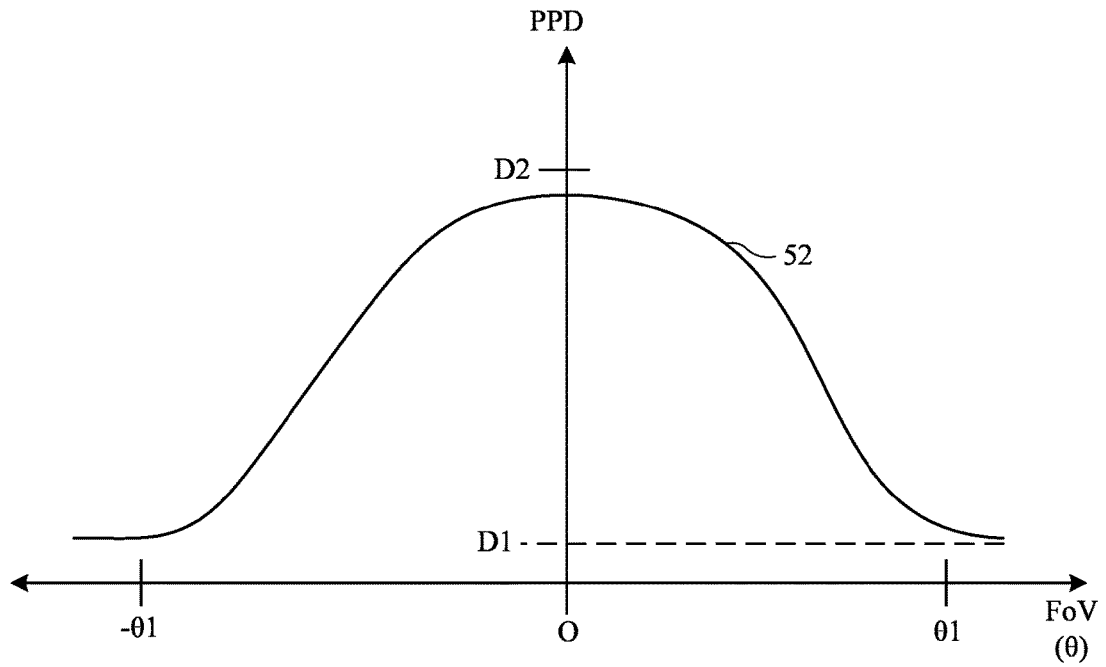
FIG. 5 is a plot of pixel density (pixels-per-degree) as a function of field of view angle for a statically foveated image that may be output by a lens of the type shown in FIG. 2 in accordance with some embodiments.

Curve 52 of FIG. 5 plots pixel density as a function of angle for statically foveated image 44 within the field of view of lens 34. The vertical axis of FIG. 5 plots pixel density in pixels-per-degree (PPD). The horizontal axis plots of FIG. 5 plots the angle θ within the field of view (FoV) of lens 34 (e.g., where angle θ is measured relative to the optical axis of lens 34), which also represents pixel position within the image.

As shown by curve 52, statically foveated image 44 may have a relatively high (e.g., peak) pixel density D2 at the center of the field of view (e.g., at the center of the image and the optical axis of lens 34). This may correspond to the relatively high resolution of statically foveated image 44 within region 46 of FIG. 4. Statically foveated image 44 may have a reduced pixel density at relatively high angles off of the center of the field of view (e.g., off the optical axis and near the periphery of the field of view). For example, statically foveated image 44 may have a minimum pixel density D1 at angles θ1 and −θ1 off of the center of the field of view. This may correspond to the relatively low resolution of statically foveated image 44 within regions 48 of FIG. 4.

As examples, pixel density D2 may be 30 PPD, 25 PPD, 20 PPD, 35 PPD, between 25 and 35 PPD, between 20 and 30 PPD, between 20 and 35 PPD, greater than 30 PPD, etc. Pixel density D1 may be 18 PPD, 20 PPD, 15 PPD, between 15 and 25 PPD, between 15 and 20 PPD, between 10 and 20 PPD, less than 25 PPD, less than 20 PPD, or any other density less than pixel density D2. Angle θ1 may be 26 degrees (e.g., in scenarios where lens 34 has a 52°×52° field of view), 25 degrees, between 25 and 30 degrees, between 20 and 30 degrees, etc. Curve 52 may have any desired roll-off (shape).

Figure 6:
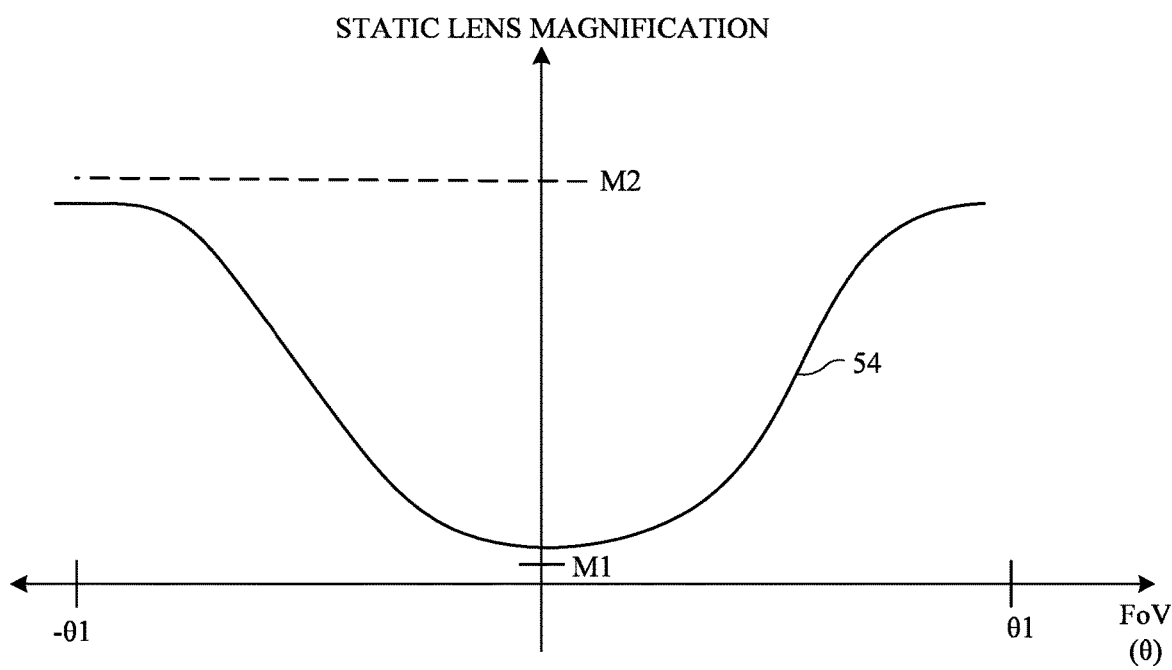
FIG. 6 is a plot of magnification as a function of field of view angle for a lens of the type shown in FIG. 2 in accordance with some embodiments.

FIG. 6 is a plot showing how the magnification of lens 34 may vary as a function of angle within the field of view to produce statically foveated image 44 of FIG. 4 and curve 52 of FIG. 5. As shown in FIG. 6, curve 54 plots the magnification of lens 34 as a function of angle θ within the field of view. As shown by curve 54, lens 34 may exhibit a relatively low (e.g., minimum) magnification M1 at the center of the field of view (e.g., at the center of the image and the optical axis of lens 34). Magnification M1 may be zero (e.g., no magnification) if desired. This low magnification may allow the pixels 50 within region 46 of FIG. 4 to have a relatively high pixel density and thus a relatively high resolution. Lens 34 may exhibit a relatively high (e.g., peak) magnification M2 at relatively high angles off of the center of the field of view (e.g., off the optical axis and near the periphery of the field of view). For example, lens 34 may exhibit a maximum magnification M2 at angles θ1 and −θ1 off of the center of the field of view. This high magnification may increase the apparent size of each pixel 50 within regions 48 of FIG. 4, thereby causing the pixels 50 within regions 48 to have a relatively low pixel density and thus a relatively low resolution. Curve 54 may have any desired roll-off (shape).

Lens 34 may have one or more lens elements. The number, shape, and arrangement of each of the lens elements may be selected to produce the magnification associated with curve 54 of FIG. 6 (e.g., so that lens 34 produces statically foveated image 44 having a pixel density such as the pixel density associated with curve 52 of FIG. 5). For example, lens 34 may be configured to exhibit a mapping function (image height, e.g., in millimeters) $h_{img}$ that is a function of angle θ within the field of view, as given by equation (1):

$$h_{img}(\theta) = f * \alpha * \sin(\theta/\beta) \qquad (1)$$

where f, α, and β are constants, "sin( )" is the sine operator, "/" is the division operator, and "*" is the multiplication operator. Constants f, α, and β may, for example, be determined from a parametric fit. As just one example, constant f may be 8.6 mm, constant α may be 0.5, and constant β may be 0.49. This is merely illustrative and, in general, constants f, α, and β may have other values, the mapping function may have other forms, and the lens elements may have other arrangements if desired.

Figure 7:
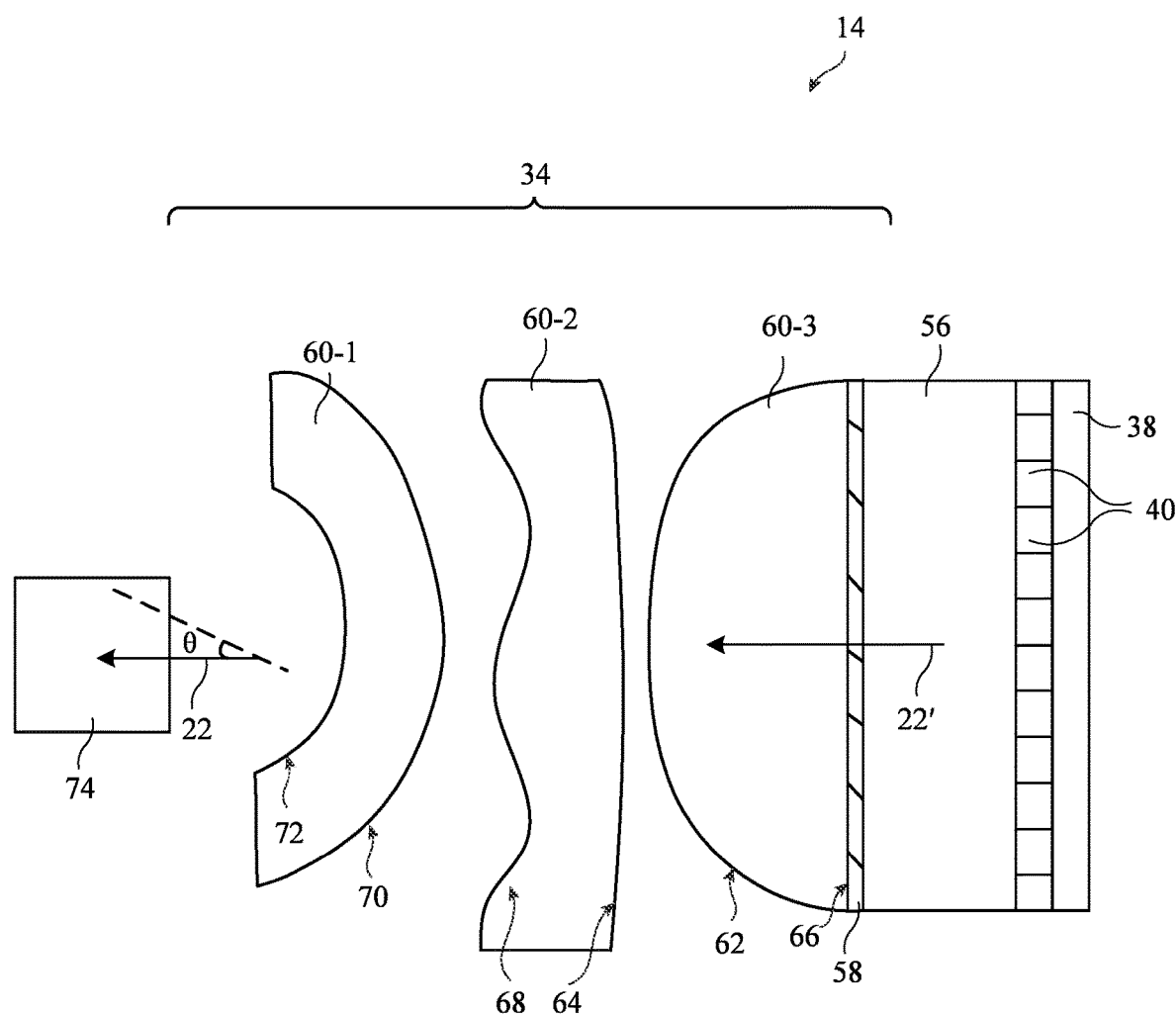
FIG. 7 is a diagram of an illustrative lens that performs static foveation operations on image light in accordance with some embodiments.

FIG. 7 is a diagram showing one possible arrangement that may be used to form lens 34. Lens 34 of FIG. 7 may, for example, implement the mapping function given by equation (1) and/or the non-uniform magnification associated with curve 54 of FIG. 6, and may produce statically foveated image 44 of FIG. 4 (e.g., as characterized by curve 52 of FIG. 5).

As shown in FIG. 7, lens 34 may include one or more lens elements 60 such as a first lens element 60-1, a second lens element 60-2, and a third lens element 60-3. Lens element 60-2 may be optically interposed between lens elements 60-1 and 60-3. Lens element 60-3 may be optically interposed between lens element 60-2 and display module 14A.

In the example of FIG. 7, display module 14A includes display panel 38 (e.g., a reflective display panel such as a DMD or LCOS panel). Prism 56 (e.g., prism 42 of FIG. 3) may be interposed between lens element 60-3 and display panel 38. If desired, lens element 60-3 and/or display panel 38 may be mounted to prism 56. This is merely illustrative and, if desired, an emissive display panel or other types of display modules may be used. Lens 34 and display module 14A (e.g., display 14) may, for example, be non-telecentric.

Light 22' (e.g., light reflected off of display panel 38 and including an image to be displayed) may pass through lens 34, which optically converts light 22' into light 22 (e.g., lens 34 converts the image in light 22' into statically-foveated image 44 of FIG. 4 in light 22). Lens 34 may produce light 22 (e.g., the statically foveated image 44 in light 22) by applying, to light 22', a non-uniform magnification that varies as a function of angle θ relative to its optical axis (e.g., by applying the magnification associated with curve 54 of FIG. 6 having greater magnification at high angles θ and the periphery of the field of view and lower magnification at low angles θ and the center of the field of view to light 22').

Lens element 60-3 may have a first surface (face) 66 facing display panel 38 and an opposing second surface (face) 62 facing lens element 60-2. Lens element 60-2 may have a first surface 64 facing lens element 60-3 and an opposing second surface 68 facing lens element 60-1. Lens element 60-1 may have a first surface 70 facing lens element 60-2 and an opposing second surface 72. Prism 74 or other optical elements may be used to direct light 22 to waveguide 26 of FIG. 2. Prism 74 may be omitted if desired.

The number of lens elements 60, the arrangement of lens elements 60, the types of lens elements 60, and/or the shapes of the surfaces of lens elements 60 (e.g., surfaces 72, 70, 68, 64, 62, and 66) may be selected to provide lens 34 with the desired magnification profile (e.g., with the non-uniform magnification associated with curve 54 of FIG. 6 and the mapping function given by equation (1)), which configures lens 34 to produce statically foveated image 44 (FIG. 4) in light 22. In the arrangement of FIG. 7, for example, lens element 60-1 is a meniscus lens having curved surfaces 72 and 70 (e.g., free form curved surfaces, radially symmetric curved surfaces such as spherically curved surfaces, radially asymmetric curved surfaces such as aspherically curved surfaces, etc.), lens element 60-2 is a butterfly or V-shaped lens (e.g., having a high order aspheric surface 68 and a planar or low-curvature surface 64), and lens element 60-3 has a planar surface 66 and a curved surface 62 (e.g., a free form curved surface, a radially symmetric curved surface such as a spherically curved surface, a radially asymmetric curved surface such as an aspherically curved surface, etc.). This example is merely illustrative and, in general, any desired lens elements 60 of any desired types may be used. The surfaces of the lens elements 60 in lens 34 (e.g., surfaces 72, 70, 68, 64, 62, and 66) may have any desired shapes (e.g., free form curved shapes, radially symmetric curved shapes such as a spherical shapes, radially asymmetric curved shapes such as aspheric shapes, planar shapes, shapes having curved and planar portions, combinations of these, etc.).

If desired, an optional diffractive optical element such as diffractive optical element 58 may be interposed between lens 34 and display panel 38 (e.g., mounted to prism 56 and lens element 60-3). Diffractive optical element 58 may include a diffractive grating structure having one or more diffractive gratings (e.g., volume holograms, thin film holograms, surface relief gratings, three-dimensional metal gratings, etc.). The diffractive gratings may be partially or completely overlapping (e.g., multiplexed) or may be non-overlapping. Diffractive optical element 58 may be formed at other locations (e.g., between lens element 60-1 and prism 74, between any pair of lens elements 60 in lens 34, or elsewhere). Diffractive optical element 58 may diffract light 22' to provide light 22' with an optical power (e.g., an optical power corresponding to curve 54 of FIG. 6 or other optical powers). This may allow lens 34 to impart more optical power to light 22' without using additional lens elements, which may occupy an excessive amount of space in device 10. In another suitable arrangement, diffractive optical element 58 may be omitted. A doublet of lens elements or other types of lens elements may be used in place of diffractive optical element 58 to provide light 22' with optical power if desired.

The examples described above in which lens 34 includes lens elements 60 for performing static foveation is merely illustrative. In another suitable arrangement, lens 34 may include one or more portions of waveguide 26 (FIG. 2). For example, waveguide 26 may include one or more curved surfaces or other structures in the optical path of image light 22 that impart different optical powers on image light 22 (e.g., different optical powers for different portions of the image to produce statically foveated image 44 of FIG. 4). These portions of the waveguide may, if desired, stretch the image light in a single dimension (e.g., a horizontal dimension). This portion of the waveguide may, if desired, be used to perform field of view expansion (e.g., from 30 degrees to 45 degrees or more in the horizontal dimension). Lens 34 may include a combination of lens elements 60 and portions of waveguide 26 or may include portions of waveguide 26 without including separate lens elements 60 if desired.

If care is not taken, the non-uniform magnification imparted by lens 34 in producing statically foveated image 44 may undesirably distort the image in light 22. If desired, system 10 may perform pre-distortion operations on the images in light 22' that compensate for subsequent distortion by lens 34 in operating on light 22' (e.g., distortion caused by the non-uniform magnification of lens 34). System 10 may additionally or alternatively perform independent control of the intensity of light-emitting elements in display module 14A to mitigate for non-uniform intensity across the area of statically foveated image 44.

Figure 8:
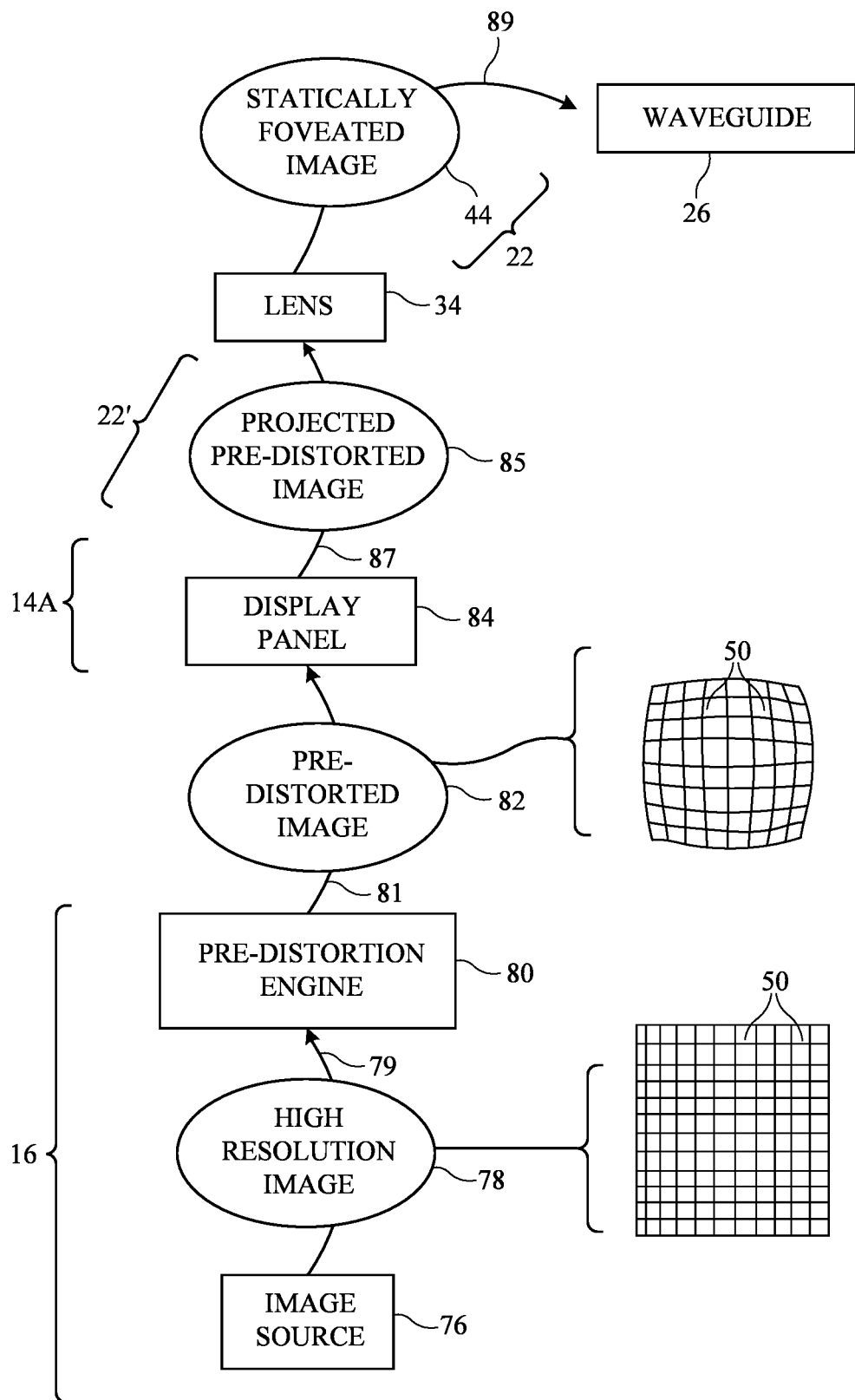
FIG. 8 is a flow diagram showing how illustrative control circuitry may perform pre-distortion operations on an image to mitigate subsequent distortion by a lens that performs static foveation operations on the image in accordance with some embodiments.

FIG. 8 is a flow diagram showing how system 10 may perform predistortion operations on the images in light 22' that compensate for subsequent distortion by lens 34 in operating on light 22'. As shown in FIG. 8, control circuitry 16 may include an image source such as image source 76 (e.g., image source circuitry) and a pre-distortion engine (e.g., pre-distortion circuitry) such as pre-distortion engine 80. Image source 76 and pre-distortion engine 80 may, for example, be implemented using hardware (e.g., dedicated circuitry) in control circuitry 16 and/or software running on control circuitry 16.

Image source 76 may produce a high resolution image such as high resolution image 78. High resolution image 78 may include pixels 50 of image data. Image source 76 may provide high resolution image 78 to pre-distortion engine 80, as shown by arrow 79.

Pre-distortion engine 80 may apply a distortion to high resolution image 78 (sometimes referred to herein as a pre-distortion) to produce pre-distorted image 82. Pre-distorted image 82 may, for example, include the same pixels 50 of image data as high resolution image 78 but where some or all of the pixels are pre-distorted relative to (e.g., larger or smaller than) the corresponding pixels in high resolution image 78 (e.g., pixels 50 near the center of image 82 may be smaller than the pixels 50 near the center periphery of image 78, pixels 50 near the edge of image 82 may be larger than the pixels 50 near the edge of image 78, etc.). The pre-distortion applied by pre-distortion engine 80 may be configured to mitigate subsequent distortion to the image by lens 34 in generating statically foveated image 44 (e.g., the pre-distortion may be an inverse of any subsequent distortion applied by lens 34 on light 22'). As examples, pre-distortion engine 80 may be implemented as a software engine (e.g., as a program containing sets of instructions for execution by a general purpose computing element such as a CPU and/or GPU) or from a set of fixed purpose transistors, logic gates, etc.

Display panel 84 in display module 14A may display (project) pre-distorted image 82 as projected pre-distorted image 85 in light 22'. Display panel 84 may be a reflective display panel (e.g., display panel 38 of FIGS. 3 and 7), an emissive display panel, or any other desired display panel or light source.

Lens 34 may magnify light 22' (e.g., using a non-uniform magnification such as the magnification associated with curve 54 of FIG. 6) to produce statically foveated image 44 in light 22. Any optical distortion produced by lens 34 on light 22' may reverse the predistortion in projected pre-distorted image 85. This may cause statically foveated image 44 to be non-distorted while still exhibiting a high resolution within region 46 (FIG. 4) and a low resolution within regions 48 (FIG. 4). Statically foveated image 44 (light 22) may be provided to waveguide 26, as shown by arrow 89. Waveguide 26 may provide light 22 and thus statically foveated image 44 to the eye box (e.g., eye box 24 of FIG. 2).

Figure 9:
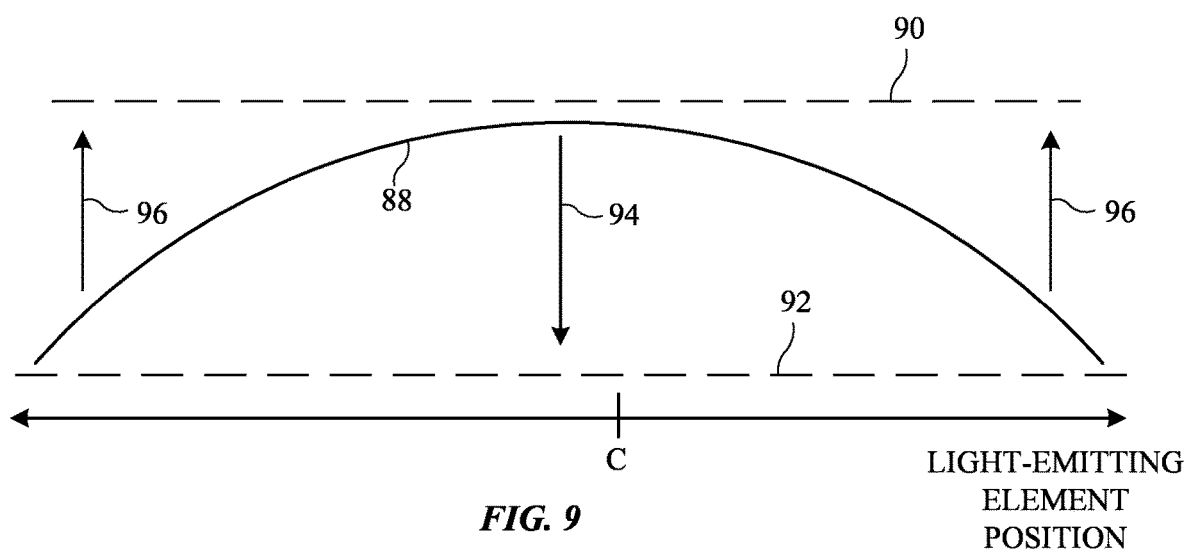
FIG. 9 is a plot showing how light-emitting elements may be independently controlled as a function of position to compensate for off-axis intensity variations in an optical system of the type shown in FIGS. 1-3, 7, and 8 in accordance with some embodiments.

If desired, the intensity of the light-emitting elements in display module 14A may be independently controlled to compensate for inherent off-axis roll off in intensity and/or distortion from lens 34. FIG. 9 is a diagram showing how the intensity of the light-emitting elements (e.g., uLEDs, lasers, LEDs, or other light-emitting elements in scenarios where display module 14A includes an emissive display or light emitting elements 35 of FIG. 3) may be independently controlled to mitigate these effects.

As shown in FIG. 9, the horizontal axis illustrates the lateral position of the light emitting elements in display module 14A (e.g., horizontal or vertical pixel position across an array of M-by-N or N-by-N light-emitting elements). Curve 88 of FIG. 9 illustrates the intensity of illumination produced by the light-emitting elements (e.g., as measured on the side of lens 34 opposite to display module 14A). Curve 90 illustrates the maximum intensity producible by the light-emitting elements. As shown by curve 88, the illumination may exhibit a roll off from a peak intensity at central axis C to a minimum intensity at positions off of central axis C (e.g., for pixels at the periphery of the array of light-emitting elements). This variation in intensity may, for example, be produced by inherent off-axis roll off in intensity associated with display module 14A and/or off-axis distortion produced by lens 34.

In order to mitigate this variation, light-emitting elements located off of central axis C (e.g., at the periphery of the array) may be independently controlled to emit light with an increased intensity, as shown by arrows 96. This boost in peripheral pixel intensity may provide illumination with a uniform intensity for each light-emitting element position by the time the light has passed through lens 34. In another suitable arrangement, the light-emitting elements located at central axis C may be independently controlled to emit light with decreased intensity (e.g., with an intensity that matches that of the lowest-intensity pixels), as shown by arrow 94. This reduction in central pixel intensity may provide illumination with a uniform intensity for each pixel position by the time the light has passed through lens 34. These adjustments in intensity may be provided by adjusting the current provided to each light-emitting element, by adjusting the pulse width modulation used to control each light-emitting element, etc. By independently controlling the intensity of each light-emitting element as a function of position, light of uniform intensity may be provided despite distortions introduced by optical system 14B. The example of FIG. 9 is merely illustrative. Curves 88, 90, and 92 may have other shapes.

Figure 10:
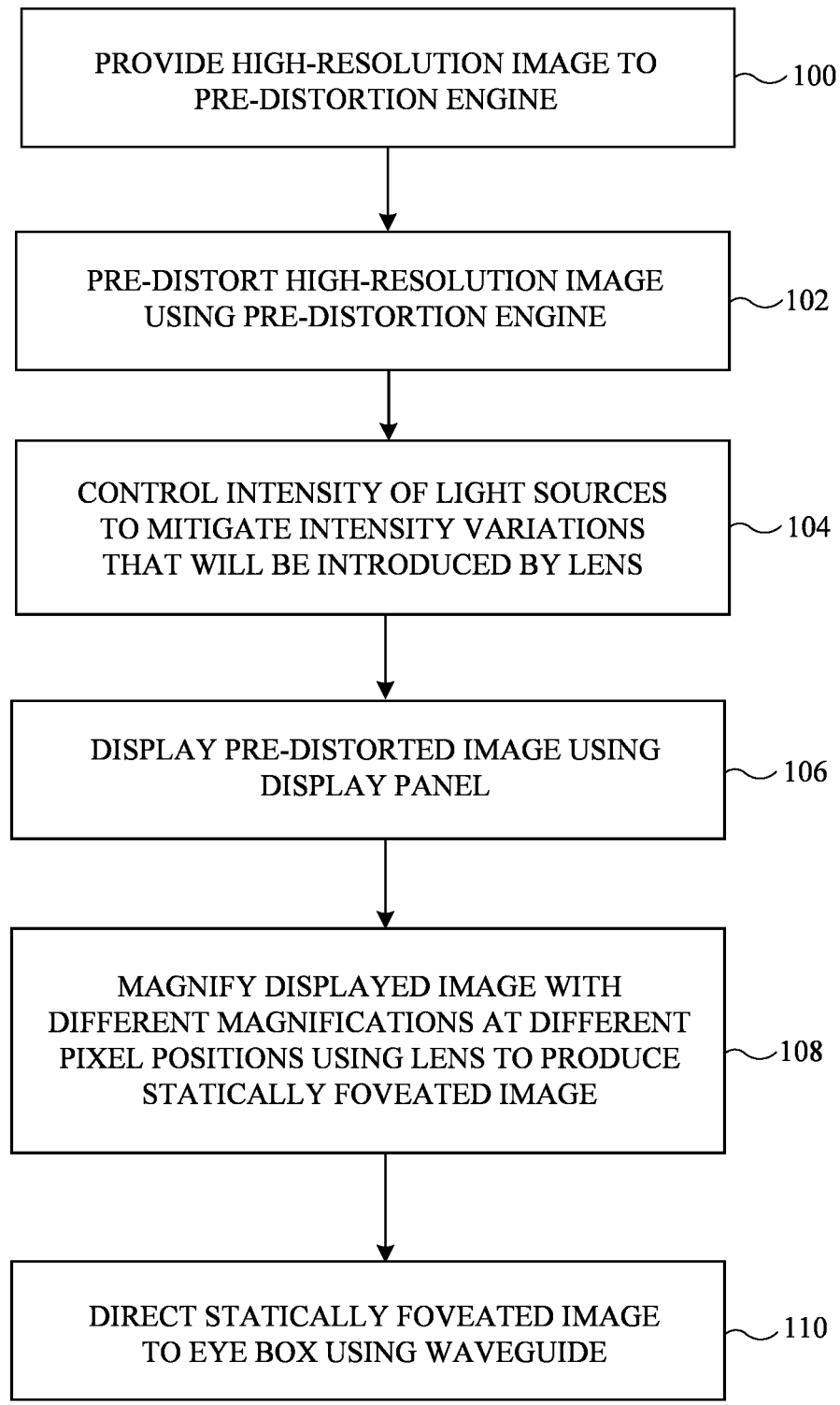
FIG. 10 is a flow chart of illustrative steps that may be performed by a display in providing statically-foveated images to an eye box in accordance with some embodiments.

FIG. 10 is a flow chart of illustrative steps that may be performed by system 10 in performing static foveation operations. At step 100, image source 76 may provide high resolution image 78 to pre-distortion engine 80.

At step 102, pre-distortion engine 80 may pre-distort high resolution image 78 to produce pre-distorted image 82. Control circuitry 16 may provide pre-distorted image 82 to display module 14A (e.g., display panel 84).

At optional step 104, control circuitry 16 may independently control the intensity of each light-emitting element in display panel 14A to mitigate for any intensity variations across the field of view (e.g., as described above in connection with FIG. 9). Step 104 may be omitted if desired.

At step 106, display panel 84 may display pre-distorted image 85 in light 22'.

At step 108, lens 34 may receive displayed pre-distorted image 85 in light 22'. Lens 34 may magnify light 22' (pre-distorted image 85) using different magnifications at different pixel positions (e.g., using the magnification associated with curve 54 of FIG. 6) to produce statically foveated image 44 in light 22.

At step 110, waveguide 26 (FIG. 2) may receive the light 22 including statically foveated image 44. Waveguide 26 may direct light 22 and thus statically foveated image 44 to eye box 24. In this way, the user may view statically foveated image 44 and may perceive the image as a high resolution image, despite the lower resolution of pixels near the periphery of the image. This may serve to maximize the effective resolution of system 10 without increasing the processing or optical resources required to display light 22 and without increasing the size of display module 14A.

The systems and methods described herein for producing statically foveated image 44 (FIG. 4) is merely illustrative. Additionally or alternatively, these systems and methods may be used to expand the field of view the image light provided at eye box 24.

In accordance with an embodiment, a display system is provided that includes a display panel having a pixel array, a light source that illuminates the pixel array to produce image light that includes an image, the image has a central region of pixels and a peripheral region of pixels surrounding the central region of pixels, a waveguide, and a lens configured to receive the image light, the lens is further configured to direct the image light towards the waveguide while applying a first magnification to the pixels in the peripheral region of the image and a second magnification to the pixels in the central region of the image, the first magnification is greater than the second magnification, and the waveguide is configured to direct the image light towards an eye box.

In accordance with another embodiment, the display panel includes a display panel selected from the group consisting of a digital-micromirror device (DMD) panel and a liquid crystal on silicon (LCOS) panel.

In accordance with another embodiment, the display panel includes an emissive display panel.

In accordance with another embodiment, the waveguide includes volume holograms configured to diffract the image light towards the eye box.

In accordance with another embodiment, the lens is characterized by a mapping function, the mapping function being a function of the sine of an angle within a field of view of the lens divided by a constant value, and the angle being measured with respect to an optical axis of the lens.

In accordance with another embodiment, the lens includes first, second, and third lens elements, the first lens elements being interposed between the second lens element and the display panel, and the second lens element being interposed between the first and third lens elements.

In accordance with another embodiment, the first lens is a meniscus lens.

In accordance with another embodiment, the second lens is a butterfly lens.

In accordance with another embodiment, the first lens element has a free form curved surface.

In accordance with another embodiment, the display system includes a diffractive optical element interposed between the lens and the display panel, the diffractive optical element being configured to provide an optical power to the image light.

In accordance with another embodiment, the display system includes a pre-distortion engine configured to apply a pre-distortion to the image in the image light produced by the display panel, the lens applies a distortion to the image light, and the pre-distortion is an inverse of the distortion applied by the lens.

In accordance with another embodiment, the light source includes first and second light-emitting elements, the display system includes control circuitry, the control circuitry is configured to control the first light-emitting element to illuminate the pixel array with a first intensity of light, and the control circuitry is configured to control the second light-emitting element to illuminate the pixel array with a second intensity of light that is different from the first intensity.

In accordance with an embodiment, an electronic device is provided that includes an image source configured to produce an image, a pre-distortion engine configured to generate a pre-distorted image by applying a pre-distortion to the image, a display module configured to display light that includes the pre-distorted image, a lens having a field of view, the lens is configured to receive the light that includes the pre-distorted image from the display module, the lens is configured to produce a foveated image based on the pre-distorted image by applying a non-uniform magnification to the light, and the non-uniform magnification varies as a function of angle within the field of view, and a waveguide configured to direct the foveated image towards an eye box.

In accordance with another embodiment, the predistortion compensates for a distortion associated with the non-uniform magnification applied to the light by the lens.

In accordance with another embodiment, the field of view of the lens has a central region and a peripheral region surrounding the central region and the non-uniform magnification includes a first amount of magnification within the central region and a second amount of magnification within the peripheral region, the second amount of magnification being greater than the first amount of magnification.

In accordance with another embodiment, the foveated image has a first resolution within the central region and a second resolution within the peripheral region, the second resolution being less than the first resolution.

In accordance with another embodiment, the electronic device includes control circuitry, the control circuitry is configured to independently control intensities of light-emitting elements within the display module to mitigate for non-uniform intensity in the light.

In accordance with another embodiment, the lens includes a portion of the waveguide.

In accordance with an embodiment, an electronic device is provided that includes a head-mounted support structure, a display module supported by the head-mounted support structure, the display module is configured to produce light that includes an image, a waveguide supported by the head-mounted support structure, and a lens that is configured direct the light towards the waveguide and that has an optical axis, the lens is configured to produce a foveated image in the light by applying, to the image in the light, a first magnification at a first angle with respect to the optical axis and a second magnification at a second angle with respect to the optical axis, the first angle is smaller than the second angle, the first magnification is less than the second magnification, and the waveguide is configured to direct the foveated image in the light towards an eye box.

In accordance with another embodiment, the display module includes a spatial light modulator and a light source that is configured to illuminate the spatial light modulator to produce the light that includes the image.

The foregoing is merely illustrative and various modifications can be made to the described embodiments. The foregoing embodiments may be implemented individually or in any combination.

What is claimed is:

1. A display system comprising:
    a display panel having a pixel array;
    a light source that illuminates the pixel array to produce image light that includes an image, wherein the image has a central region of pixels and a peripheral region of pixels surrounding the central region of pixels;
    a waveguide; and
    a lens configured to receive the image light, wherein the lens is further configured to direct the image light towards the waveguide while applying a first magnification to the pixels in the peripheral region of the image and a second magnification to the pixels in the central region of the image, wherein the first magnification is greater than the second magnification, and wherein the waveguide is configured to propagate the image light as a foveated image via total internal reflection.

2. The display system defined in claim 1, wherein the display panel comprises a display panel selected from the group consisting of: a digital-micromirror device (DMD) panel and a liquid crystal on silicon (LCOS) panel.

3. The display system defined in claim 1, wherein the display panel comprises an emissive display panel.

4. The display system defined in claim 1, wherein the waveguide comprises volume holograms configured to diffract the image light.

5. The display system defined in claim 1, wherein the lens is characterized by a mapping function, the mapping function being a function of the sine of an angle within a field of view of the lens divided by a constant value, and the angle being measured with respect to an optical axis of the lens.

6. The display system defined in claim 1, wherein the lens comprises first, second, and third lens elements, the first lens element being interposed between the second lens element and the display panel, and the second lens element being interposed between the first and third lens elements.

7. The display system defined in claim 6, wherein the first lens element is a meniscus lens.

8. The display system defined in claim 7, wherein the second lens element is a butterfly lens.

9. The display system defined in claim 6, wherein the first lens element has a free form curved surface.

10. The display system defined in claim 1, further comprising:
   a diffractive optical element interposed between the lens and the display panel, the diffractive optical element being configured to provide an optical power to the image light.

11. The display system defined in claim 1, further comprising:
   a pre-distortion engine configured to apply a pre-distortion to the image in the image light produced by the display panel, wherein the lens applies a distortion to the image light, and wherein the pre-distortion is an inverse of the distortion applied by the lens.

12. The display system defined in claim 1, wherein the light source comprises first and second light-emitting elements, the display system further comprising:
   control circuitry, wherein the control circuitry is configured to control the first light-emitting element to illuminate the pixel array with a first intensity of light, and wherein the control circuitry is configured to control the second light-emitting element to illuminate the pixel array with a second intensity of light that is different from the first intensity.

13. An electronic device comprising:
   an image source configured to produce an image;
   a pre-distortion engine configured to generate a pre-distorted image by applying a pre-distortion to the image;
   a display module configured to display light that includes the pre-distorted image;
   a lens having a field of view, wherein the lens is configured to receive the light that includes the pre-distorted image from the display module, wherein the lens is configured to produce a foveated image based on the pre-distorted image by applying a non-uniform magnification to the light, and wherein the non-uniform magnification varies as a function of angle within the field of view; and
   a waveguide configured to propagate the foveated image via total internal reflection.

14. The electronic device defined in claim 13, wherein the predistortion compensates for a distortion associated with the non-uniform magnification applied to the light by the lens.

15. The electronic device defined in claim 14, wherein the field of view of the lens has a central region and a peripheral region surrounding the central region and wherein the non-uniform magnification comprises a first amount of magnification within the central region and a second amount of magnification within the peripheral region, the second amount of magnification being greater than the first amount of magnification.

16. The electronic device defined in claim 15, wherein the foveated image has a first resolution within the central region and a second resolution within the peripheral region, the second resolution being less than the first resolution.

17. The electronic device defined in claim 16, further comprising:
   control circuitry, wherein the control circuitry is configured to independently control intensities of light-emitting elements within the display module to mitigate for non-uniform intensity in the light.

18. The electronic device defined in claim 13, wherein the lens comprises a portion of the waveguide.

19. An electronic device comprising:
   a head-mounted support structure;
   a display module supported by the head-mounted support structure, wherein the display module is configured to produce light that includes an image;
   a waveguide supported by the head-mounted support structure; and
   a lens that is configured to direct the light towards the waveguide and that has an optical axis, wherein the lens is configured to produce a foveated image in the light by applying, to the image in the light, a first magnification at a first angle with respect to the optical axis and a second magnification at a second angle with respect to the optical axis, wherein the first angle is smaller than the second angle, wherein the first magnification is less than the second magnification, and wherein the waveguide is configured to propagate the foveated image via total internal reflection.

20. The electronic device defined in claim 19, wherein the display module comprises a spatial light modulator and a light source that is configured to illuminate the spatial light modulator to produce the light that includes the image.

* * * * *